United States Patent [19]
Schuster et al.

[11] 3,732,839
[45] May 15, 1973

[54] FRICTION REDUCER

[75] Inventors: Siegfried Schuster, 1 Berlin 38; Franz Peter Kilian, 1 Berlin 31; Horst Rachner, 2 Wedel/Holstein, all of Germany

[73] Assignee: Licentia Patent-Verwaltungs-G.m.b.H., Frankfurt, Germany

[22] Filed: June 8, 1970

[21] Appl. No.: 44,255

[30] Foreign Application Priority Data

June 6, 1969  Germany ..................... P 19 28 869.8

[52] U.S. Cl. .................. 114/67 R, 114/67 A
[51] Int. Cl. .................................. B63b 1/34
[58] Field of Search ............. 114/67 R, 67 A, 232, 114/233

[56] References Cited

UNITED STATES PATENTS

| | | | |
|---|---|---|---|
| 2,954,750 | 10/1960 | Crump et al. | 114/67 X |
| 3,289,623 | 12/1966 | Gray et al. | 114/67 A |
| 3,205,847 | 9/1965 | Smith | 114/67 A |
| 3,326,296 | 6/1967 | Hill et al. | 114/67 A |
| 3,392,693 | 7/1968 | Hulsebos et al. | 114/67 R |

*Primary Examiner*—Milton Buchler
*Assistant Examiner*—Stuart M. Goldstein
*Attorney*—Spencer and Kaye

[57] ABSTRACT

The outer skin of a water vehicle such as a boat is provided with openings through which additives can be continuously emitted to reduce boundary layer drag on the vehicle.

1 Claim, 7 Drawing Figures

PATENTED MAY 15 1973 3,732,839

FRICTION REDUCER

BACKGROUND OF THE INVENTION

The present invention relates to an apparatus and method for reducing frictional drag on water vehicles by introducing additives into the boundary layer.

It is known that the frictional drag in pipes and on plates and other bodies, which is present during relative movement of water past such objects, can be considerably reduced by adding certain polymers to the water. It is also known that these additives are only necessary in the boundary layer. Previous attempts to use this knowledge to effectively and economically decrease drag have been generally unsuccessful.

SUMMARY OF THE INVENTION

An object of the present invention, therefore, is to provide an effective and economically feasible structure and method for using additives to decrease drag on water vehicles.

This as well as other objects which will become apparent in the discussion that follows are achieved, according to the present invention, by providing the body of a water vehicle at least partially with a permeable outer skin through which additives may be introduced into the boundary layer. The outer skin of the body of the water vehicle can be made of sheet, such as sheet metal, provided with holes or it can be made of capillary membranes. Such outer skin is so situated on the body of the water vehicle that a desired concentration of polymeric additives arises in all parts of the boundary layer. The term "permeable" is used to indicate that there is an array of small holes throughout the area of the outer skin.

In order, for example, to achieve a constant concentration of additive in the water of the boundary layer, the amounts of additive passing through the permeable outer skin of the water vehicle of the present invention must follow the same functional relationship followed by the thickness of the boundary layer as one proceeds along the water vehicle. Such controlled introduction of additives into the boundary layer is possible only with a permeable outer skin as opposed to a skin having a slit.

The resulting necessity for a controlling of the amount of additive fed into the boundary layer as a function of position means that additives must be fed into the boundary layer at certain parts of the water vehicle while in other parts no introduction of additive must occur, while in yet other parts additive must be sucked out of the boundary layer by an actual sucking away of part of the boundary layer itself. A sucking away of additive-laden boundary layer has the additional advantage that a portion of the additive is recaptured. Also, the requisite sucking action leads to a decrease in the drag on the body for other reasons known in the art.

The surface of the body of the water vehicle is, for example at least partially, provided with a double-walled structure, so that the polymeric solution used as additive can be provided between the actual hull of the water vehicle and the pierced sheet or capillary membrane forming the wetted outer skin of the water vehicle. The separations and the diameters of the holes or capillaries, that is the effective permeability of the outer skin, can be so varied that the amount of solution entering into the boundary layer can correspond to that which is desired. Permeable skin has the advantage over a skin with a slit, because the dosage of polymeric solution into the boundary layer is capable of greater control as a function of location. Also, injection flow velocity of additive into the boundary layer can be reduced and this reduces drag from that obtainable with injection through a slit.

The sheet and capillary membranes forming the outer skin of the present invention can be provided with appropriate reinforcement to increase their strength and their ability to retain their shapes.

The requisite energy needed to feed the polymeric additives into the boundary layer can be extracted from the pressure gradients existing on the body of the water vehicle due to the relative streaming of water on its outer surface. Thus, holes provided in regions of higher pressure can be used to conduct water to highly concentrated polymeric additive solutions with the resulting diluted solution then flowing into regions in the boundary layer having lower pressures.

DESCRIPTION OF THE PREFERRED EMBODIMENTS

Figure 1:
FIG. 1 is a schematic representation of a permeable outer skin of a water vehicle in accordance with the present invention.

Referring now to FIG. 1, portion 1 of a permeable outer skin 2 of a water vehicle is provided with openings 3, through which additive may reach the boundary layer 4.

Figure 2:
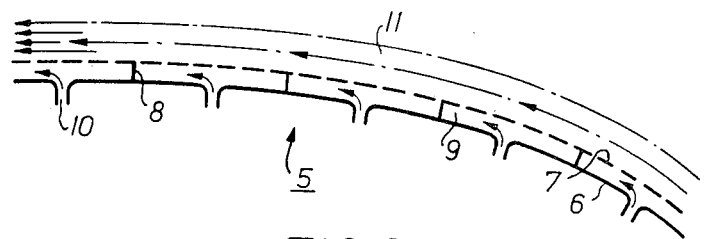
FIG. 2 is a schematic representation of a permeable outer skin arranged over the hull of a water vehicle.

FIG. 2 shows a situation in which the structure of the present invention is being used to reduce the drag of water on a water vehicle. Underwater part 5 of the body of a water vehicle comprises a hull 6, which is the principal load-supporting structure, and an outer skin 7. The outer skin 7 is made of sheet metal provided with holes or of a capillary membrane and is connected with the hull 6 via ribbing 8. The skin 7 is spaced from the hull 6 and the skin 7, hull 6, and ribbing 8 form separate chambers 9. Premixed polymer moves into these chambers 9 through feed lines 10. The permeability of the outer skin 7 is varied, so that optimum concentrations of solution in the boundary layer 11 may be present for reducing drag.

Figure 3:
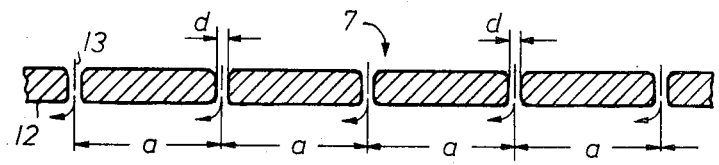
FIG. 3 is a cross-sectional view through a portion of a permeable outer skin according to the present invention.

FIG. 3 shows an enlarged section through an outer skin 7. Variation in the permeability of this particular outer skin 12 can be achieved by varying the distances $a$ between the separate holes 13. Variation in permeability can also be achieved by varying the diameter $d$ of the holes, or a combination of variations in diameters $d$ and distances $a$ can be used.

Figure 4A:
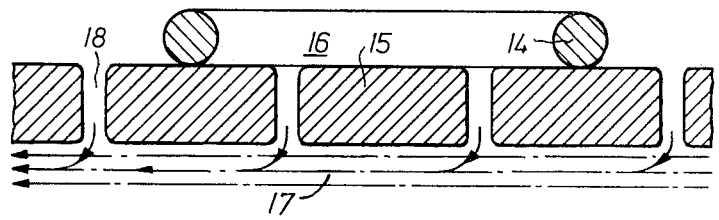
FIGS. 4a and 4b are sectional views through portions of permeable reinforced outer skins of the present invention.

As an example of means for providing requisite strength of the outer skin, a coarse reticulation 14 is attached in FIG. 4a to the pierced sheet metal or capillary membrane 15. The reticulation 14 is provided on the interior side of the outer skin. That side of the outer skin 15 facing the boundary layer 17 remains smooth, except for the holes 18 whose diameter is maintained so small that no roughness is apparent.

Figure 4B:
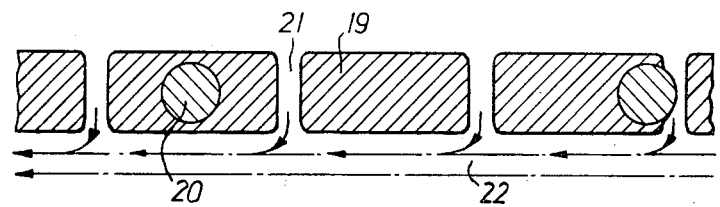

The capillary membrane 19 illustrated in FIG. 4b is provided with strength by reinforcement strands 20. Such strands can be provided within the membrane itself during manufacture or they can be pressed into the membrane. The distances between the separate strands of the reinforcement are maintained large relative to the separations between the individual capillaries 21, so that the accidental closing of any particular capillary 21 has no noticeable effect on the feeding of the polymeric solutions into the boundary layer 22. The strands can be provided, for example, in wire, glass, or plastic mats.

Figure 5:
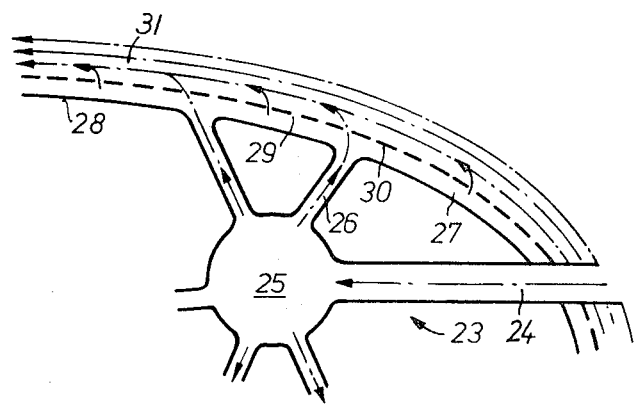
FIG. 5 is a schematic view of a system for introducing additive into a boundary layer according to the present invention.

FIG. 5 shows a portion 23 of the underwater part of a water vehicle according to the present invention. The opening 24 opens into a high pressure region of the water streaming by the vehicle and water consequently flows into container 25 to dilute a polymeric solution present in the container and/or to force polymeric solution through the feed lines 26 into the space 27 between the hull 28 and the outer skin 30 and thence through the openings 29 of the outer skin 30 into the boundary layer 31.

Figure 6:
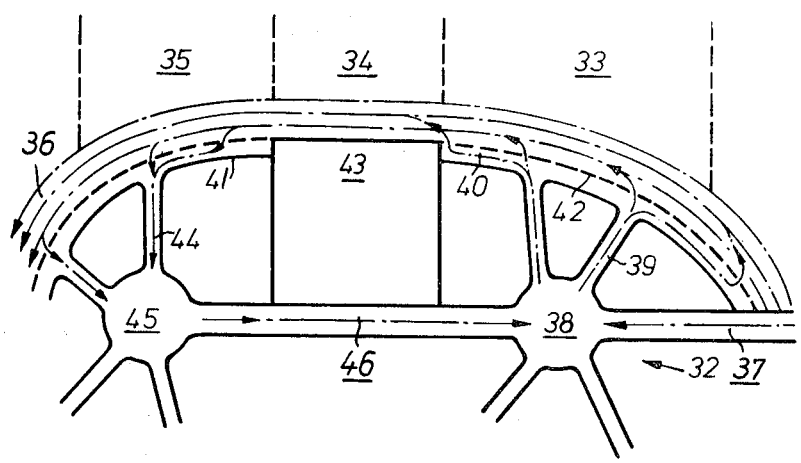
FIG. 6 is a schematic view of structure for the recapture and reuse of additive.

FIG. 6 illustrates a portion 32 of an underwater part of the body of a water vehicle. The flow of water relative to the vehicle is from right to left in this Figure. In section 33, additive is injected into the boundary layer 36, while in section 34 no injection occurs, since, for example, the boundary layer thickness remains constant, thus giving a constant concentration of additive in the boundary layer. The boundary layer is sucked away in section 35.

Water flows in through opening 37 in the direction shown by the arrow and upon reaching container 38 mixes with the polymeric solution and forces it through the feed lines 39 into the space 40 between the hull 41 and the outer skin 42. The polymeric solution then moves through the holes in the outer skin into the boundary layer 36.

The outer skin 43 in section 34 does not have holes or capillaries. In section 35, downstream where the relative velocity of the water is low, a part of the boundary layer volumn is sucked in through the openings of the outer skin 42 and through the lines 44 by means of pump 45. Pump 45 then feeds the removed boundary layer through line 46 into the container 38, thus to reuse a portion of dilute additive for refeeding into the boundary layer via container 38. The direction of flow of additive in the boundary layer is shown by the small arrows at the outer skin 42.

In the following an example based on FIG. 5 will be given. A deeply submerged body may have a length of 5 m, a diameter of 0.534 m and a speed of 30 kts = 15.4 m/s, a cylindrical central part of 3.75 m in length, a sperical head and an outrunning stern with tail units. At a Reynolds number of $R_n = 7.7 \times 10^7$ (water temperature 20°C), this body has a total resistance coefficient $C_T = 2.75 \times 10^{-3}$, which give, for a residuary resistance of 20 percent, the drag coefficient $C_F = 2.2 \times 10^{-3}$. Experimental friction reduction tests indicate at this $R_n$ an optimal concentration of 30 weight parts per million Polyethylene oxide (Union Carbide WSR 301). Under these conditions similarity calculations for plates according to Wells result in a drag coefficient $C_{Fo} = 0.615 \times 10^{-3}$ (drag, reduction 72 percent). Relative to the total drag a drag reduction of 57.6 percent is achieved.

According to the present invention a homogeneous solution of equal concentration in the boundary layer 31 (FIG. 5) will be reached when all over the body the ratio of boundary layer volume per second $\dot{V}$ to injection volume per second $\dot{Q}$ is kept constant. Therefore it is necessary to determine V as a function of $x$, the distance from the stagnation point (for instance according to Schlichting). In practice porous media are available only with constant permeability. For these practical reasons it is necessary to approximate the function $\dot{V}(x)$ by means of Polygons. In such a polygon section the required permeability of the outer skin 30 is constant. This approximation can be applied only to that part of the body where the static pressure $p_a$ in the boundary layer 31 does not change considerably. In the area of strong pressure gradients the sections of constant permeability will be determined by parabola approximation of the function $\dot{V}(x)$ and the pressure distribution $p_a$ in 31, supposing the static pressure $p_i$ in 27 being constant. Success depends on the exactness of approximation to the real functions of $\dot{V}$ and $p_a$.

In this example the area of constant permeability was determined in the range of x between 1.75 and 2.25 m. 600 weight parts per million is the concentration of the injected polymeric solution. This results in a ratio of $\dot{Q}/\dot{V} = 1/19$ with a boundary layer concentration of 30 wppm ($\dot{Q} = (1/19) \times 168.6 = 8.87$ liters/sec.). Due to the fact that $p_a$ on a point x alters and the injection velocity $v_e$ has to stay nearly constant, the pressure difference $p_i - p_a = \Delta p$ is selected at 2.000 kp/m². In consideration of the drag coefficient of the holes in the outer skin $\xi_1 = 1.8$ the injection velocity is determined to $v_e = 0.3 \times U = 4.62$ m/s. The injection area of the outer skin is $F = \dot{Q}/V_e = 19.2$ cm². The diameter of the holes taking into account two criteria will be fixed to $d = 0.5$ mm.

The criteria are
1. the diameter should not exceed 0.5 mm in order to prevent roughness effects,
2. the smallest diameter depends on the consistency off the injected solution in order to prevent plugging.

The distance of the holes to each other is $a = 0.924$ cm. The injection flow rate required for the total body amounts to 43.8 liters/sec. The opening 24 has a diameter of $D = 6.04$ cm and is located in a region near the stagnation point. In mixer section 25 the required amount of polymer of $26.3/0.9 = 29.2$ gr/sec is added to the water. With a dwell time of approximately 10 sec the solution reached will be homogeneous to 90 percent. The feed line 26 in the section observed is mounted on the bottom of the inner section and has a semi circular cross section with a radius $R = 6.2$cm. The condition that the flow velocity in the spacing 27 has to be lower than $v_e$ results in a slot width $s = 0.6$ cm. The porous outer skin of a kind pertaining to commercial customs for instance can be glued on a bar gate; its web plates are equipped with openings in order to evenly distribute the polymer solution in spacing 27.

Instead of a porous outer skin for instance manufactured of sheet metal also capillary membranes can be used. Herewith the permeability of these membranes will be calculated in accordance with Darcy's law. If a larger diameter has to be chosen (see criterium 2) the required permeability will be achieved by covering up parts of the capillary membrane. For instance, the not reinforced "Isoporen Membrane", Type A, as produced by the Kalle AG, Wiesbaden, Germany, can be installed. The manufacturing process of such membranes allows its reinforcing by means of a grid. The physical characteristics of not reinforced membranes can be obtained from that firm. The strength of the reinforced membranes corresponds to the strength of the grid's nature. The grid is also used for connecting the capillary membrane with hull 28.

Detailed chemistry of the polyethylene oxide WSR 301 can be obtained from the Technical Report of Union Carbide: F.W. Stone and J.J. Strutta, Ethylene oxide, polymers, in Encycl. Polym.Sc. and Technol., Vol. 6, John Wiley & Sons, Inc. 1967. Besides polyethylene oxide many other drag reducing materials may be applied (Reference: J.W. Hoyt and A.G. Fabula: The effects of additives in fluid friction in 5th Symposium of Naval Hydrodynamics, Sep 64). Applying other polymers than Polyox WSR 301 the data given in the above example may change considerably. This also would be the case by using other injection concentrations.

It will be understood that the above description of the present invention is susceptible to various modifications, changes and adaptations, and the same are intended to be comprehended within the meaning and range of equivalents of the appended claims.

1. A method for reducing drag on a water vehicle, comprising moving the water vehicle through water and passing a drag-reducing additive different from water through a permeable underwater outer skin of the vehicle for keeping the ratio of boundary layer volume per second to injection volume per second constant for obtaining and maintaining a homogeneous solution of equal concentration in the boundary layer on the vehicle.

* * * * *